US011425657B2

(12) United States Patent
Kim et al.

(10) Patent No.: US 11,425,657 B2
(45) Date of Patent: Aug. 23, 2022

(54) METHOD AND APPARATUS FOR TRANSMITTING SENSOR DATA WITH LOW POWER

(71) Applicant: Dialog Semiconductor Korea Inc., Gyeonggi-do (KR)

(72) Inventors: Hee Jun Kim, Yongin-si (KR); Beomjin Kim, Seongnam-si (KR)

(73) Assignee: Dialog Semiconductor Korea Inc., Seoul (KR)

( * ) Notice: Subject to any disclaimer, the term of this patent is extended or adjusted under 35 U.S.C. 154(b) by 191 days.

(21) Appl. No.: 16/860,181

(22) Filed: Apr. 28, 2020

(65) Prior Publication Data

US 2020/0351785 A1 Nov. 5, 2020

(30) Foreign Application Priority Data

Apr. 30, 2019 (KR) .................... 10-2019-0050202

(51) Int. Cl.
*H04W 52/02* (2009.01)
*H04W 84/18* (2009.01)
(Continued)

(52) U.S. Cl.
CPC ....... *H04W 52/0235* (2013.01); *H04L 1/1812* (2013.01); *H04L 69/16* (2013.01); *H04W 84/18* (2013.01)

(58) Field of Classification Search
CPC .... H04W 52/02; H04W 84/18; H04L 1/1812; H04L 69/16
See application file for complete search history.

(56) References Cited

U.S. PATENT DOCUMENTS 7,020,701 B1 * 3/2006 Gelvin ................. G01D 21/00
  250/332
9,894,605 B2 * 2/2018 Ma ..................... H04W 52/0209
(Continued)

FOREIGN PATENT DOCUMENTS

KR  10-2010-0056334    5/2010
KR  10-2011-0078907    7/2011
(Continued)

OTHER PUBLICATIONS

Korean Office Action, Application No. 10-2019-0050202, Applicant: FCI Inc., dated Dec. 31, 2019, 7 pages.

*Primary Examiner* — Kent Krueger
(74) *Attorney, Agent, or Firm* — Saile Ackerman LLC; Stephen B. Ackerman

(57) ABSTRACT

A sensor data transmitting apparatus that transmits sensor data with low power and a method therefor are provided. According to an embodiment of the disclosure, a sensor data transmitting apparatus that transmits sensor data includes: a wireless communicator configured to access a network through an access point (AP); a timer module configured to generate a wake-up signal in a predetermined cycle; a storage configured to include a non-volatile memory and a volatile memory, a small booting code and a full booting code being recorded in the non-volatile memory and the volatile memory being capable of recording the sensor data; and a processor configured to execute the small booting code or the full booting code, collect the sensor data from a sensor after executing the small booting code, and transmit the sensor data to the AP.

11 Claims, 8 Drawing Sheets

(51) Int. Cl.
*H04L 1/18* (2006.01)
*H04L 69/16* (2022.01)

(56) References Cited

U.S. PATENT DOCUMENTS

| | | | | |
|---|---|---|---|---|
| 2006/0209176 A1* | 9/2006 | Nakamura | ............. | G08B 25/10 |
| | | | | 348/14.01 |
| 2007/0260867 A1* | 11/2007 | Ethier | ................... | G06F 9/4418 |
| | | | | 713/2 |
| 2015/0023161 A1* | 1/2015 | Alisawi | ............... | H04L 67/2833 |
| | | | | 370/230 |
| 2015/0071139 A1* | 3/2015 | Nix | ....................... | H04W 12/02 |
| | | | | 370/311 |
| 2019/0012181 A1 | 1/2019 | Kim | | |

FOREIGN PATENT DOCUMENTS

| | | |
|---|---|---|
| KR | 10-2014-0091019 | 7/2014 |
| KR | 10-2016-0150281 | 12/2016 |
| KR | 10-2019-0006629 | 1/2019 |
| WO | 2013/063218 A1 | 5/2013 |

\* cited by examiner

METHOD AND APPARATUS FOR TRANSMITTING SENSOR DATA WITH LOW POWER

CROSS-REFERENCE TO RELATED APPLICATIONS

This application claims priority to Korean Patent Application No. 10-2019-0050202, filed on Apr. 30, 2019, which application is hereby incorporated herein by reference.

TECHNICAL FIELD

The disclosure relates to an apparatus and a method for transmitting sensor data with low power. More particularly, the disclosure relates to a sensor data transmitting apparatus and a method for booting an apparatus by dividing the booting modes.

BACKGROUND

The statements in this section merely provide background information related to the present disclosure and do not necessarily constitute prior art.

A sensor data transmitting apparatus may periodically read sensor data measured from a sensor, and may periodically transmit the sensor data to the outside of the sensor data transmitting apparatus by wired or wireless communication methods. In order for a sensor data transmitting apparatus to periodically collect and transmit sensor data, power should be consumed.

In general, a sensor data transmitting apparatus stands by in a power saving mode for most of the time, and then periodically wakes up and measures sensor data and transmits the measured data, for reducing power consumption. In case a power saving mode and rebooting are repeated, a booting code initializing other peripheral devices inside a chip as well as an essential operation code for collecting sensor data is needed. In particular, in the case of a system using an operating system (OS), the system becomes capable of executing a code measuring a sensor only after going through complex initialization processes of the peripheral devices.

Power consumption of a sensor data transmitting apparatus is generally in proportion to the operating time and the size of a code for measuring sensor data. In the case of a sensor data transmitting apparatus using a conventional booting method, the apparatus also executes codes other than an essential code for collecting sensor data, and thus there is a problem that more power than what is needed for collecting sensor data is consumed. In particular, in the case of a sensor data transmitting apparatus using a battery, the problem of consuming a large amount of power becomes more conspicuous.

SUMMARY

Accordingly, for a sensor data transmitting apparatus that periodically reads sensor data and transmits the sensor data, a method for reducing power consumption by dividing booting methods may be needed.

The embodiments of the disclosure are mainly aimed at minimizing power consumption by dividing booting modes of a sensor data transmitting apparatus into a small booting mode of repetitively implementing only the function of reading and transmitting sensor data and a full booting mode of initializing and setting other components in the apparatus depending on needs, and on the other hand, providing an apparatus that reduces time for transmitting data by transmitting data in the form of a user datagram protocol (UDP) packet and a method therefor.

Also, an embodiment of the disclosure is aimed at providing an apparatus that periodically measures a charge amount of a battery, and in case the voltage of the battery is equal to or lower than a specific standard, lowers transmission power or prevents booting in a full booting mode, and can thereby provide stable power, and a method therefor.

In accordance with at least one embodiment, the present disclosure provides a sensor data transmitting apparatus to transmit sensor data. The sensor data transmitting apparatus includes: a wireless communicator configured to access a network through an access point (AP); a timer module configured to generate a wake-up signal in a predetermined cycle; a storage configured to include a non-volatile memory and a volatile memory, a small booting code and a full booting code being recorded in the non-volatile memory and the volatile memory being capable of recording the sensor data; and a processor configured to execute the small booting code or the full booting code, collect the sensor data from a sensor after executing the small booting code, and transmit the sensor data to the AP, wherein the small booting code is executed when the processor receives the wake-up signal in a state of a sleep mode of the sensor data transmitting apparatus, and the full booting code is executed when the wireless communicator receives a unicast frame or a deauthentication frame from the AP after the sensor data is transmitted.

In accordance with another aspect of the disclosure, a method for booting a sensor data transmitting apparatus and transmitting sensor data is provided. The method includes: generating a wake-up signal in a predetermined cycle by a timer; executing a small booting code or a full booting code by a processor; storing sensor data collected by the processor in a volatile memory, a small booting code and a full booting code being recorded in the non-volatile memory and the volatile memory being capable of recording the sensor data; and collecting the sensor data from a sensor after execution of the small booting code and transmitting the sensor data to the AP, wherein the small booting code is executed when the processor receives the wake-up signal in a state of a sleep mode of the sensor data transmitting apparatus, and the full booting code is executed when receiving a unicast frame or a deauthentication frame from the AP after the sensor data is transmitted.

As described above, according to the disclosure, not all components in a sensor data transmitting apparatus are booted, but only components that are necessary for measuring and transmitting sensor data are booted, and all components are booted necessarily as needed. Thus, operating time and power consumption of a sensor data transmitting apparatus can be reduced.

Also, a sensor data transmitting apparatus has a configuration of transmitting sensor data in the form of a UDP packet. Accordingly, time for transmitting sensor data can be reduced, and loss of data can be reduced by virtue of retransmitting sensor data or transmitting sensor data with the previous data.

In addition, by measuring a charge amount of a battery periodically and lowering transmission power when the battery voltage is equal to or lower than a predetermined standard, or preventing booting in a full booting mode, stable power can be provided.

DETAILED DESCRIPTION

Figure 1:
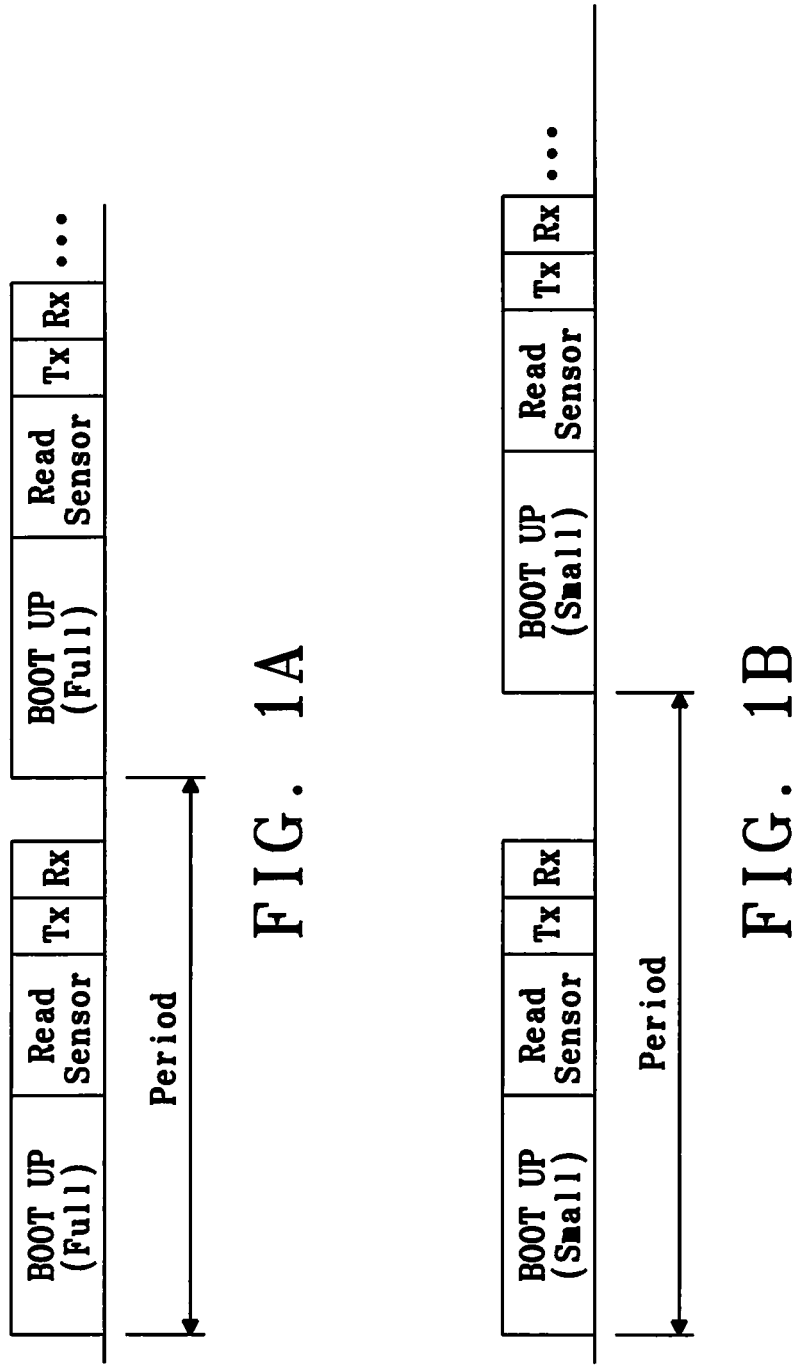
FIG. 1A is a diagram for illustrating a booting mode according to a conventional technology and a small booting mode according to the disclosure by comparison.
FIG. 1B is a diagram for illustrating a booting mode according to a conventional technology and a small booting mode according to the disclosure by comparison.

Hereinafter, at least one embodiment of the present disclosure will be described in detail with reference to the accompanying drawings. In the following description, like reference numerals designate like elements, although the elements are shown in different drawings. Further, in the following description of some embodiments, a detailed description of known functions and configurations incorporated therein will be omitted for the purpose of clarity and for brevity.

Additionally, various terms such as first, second, i), ii), a), b), etc., are used solely for the purpose of differentiating one component from the other, not to imply or suggest the substances, the order or sequence of the components. Throughout this specification, when a part "includes" or "comprises" a component, the part is meant to further include other components, not excluding thereof unless specifically stated to the contrary. The terms such as "unit," "module," and the like refer to one or more units for processing at least one function or operation, which may be implemented by hardware, software, or a combination particular.

The detailed description, which will be given below with reference to the accompanying drawings, is intended to explain exemplary embodiments of the present disclosure and is not intended to represent the only embodiments in which the present disclosure may be practiced.

FIGS. 1A and 1B are diagrams for illustrating a booting mode according to a conventional technology and a small booting mode according to the disclosure by comparison.

FIG. 1A illustrates time consumed for periodically measuring and transmitting sensor data in a booting mode according to a conventional technology, and FIG. 1B illustrates time consumed for periodically measuring and transmitting sensor data in a small booting mode.

Referring to FIG. 1A, in a booting mode according to a conventional technology, a sensor data transmitting apparatus is booted periodically, and measures data generated by a sensor and transmits the data. In this case, a code measuring sensor data becomes executable only after other devices in a chip are initialized, other than an essential operation code for measuring sensor data. Due to this, components other than components for operations necessary for periodically measuring and transmitting sensor data are also activated. Accordingly, the length of a cycle wherein a code is executed is long, and power that is more than power necessary for measuring sensor data is consumed.

Referring to FIG. 1B, a sensor data transmitting apparatus 20 according to the disclosure may execute only a code that measures and transmits data generated by a sensor without having to initialize other peripheral devices in a chip. By virtue of this, complex initialization processes of peripheral devices do not have to be performed, and thus time consumed for periodically measuring and transmitting sensor data is shorter than in FIG. 1A, and consumption of power other than power necessary for measuring and transmitting sensor data can be prevented.

Figure 2:
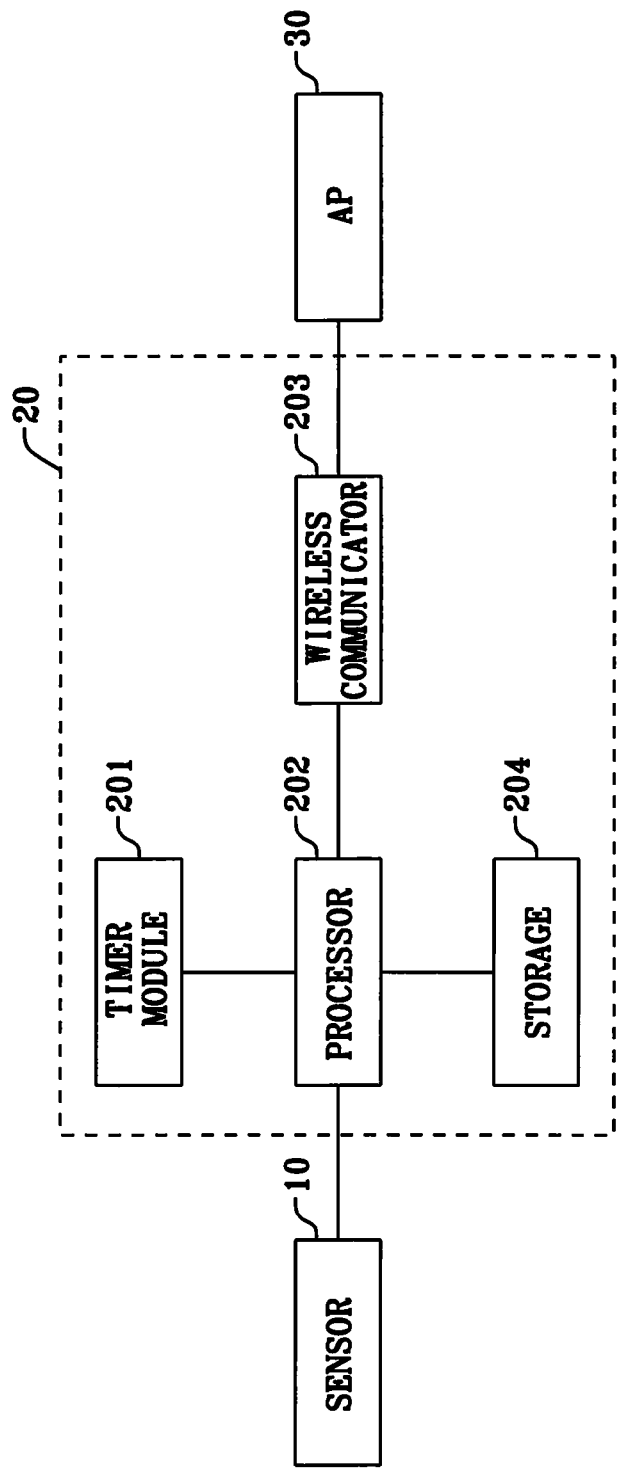
FIG. 2 is a diagram illustrating a configuration of a sensor data transmitting apparatus according to an embodiment of the disclosure.

FIG. 2 is a diagram illustrating a configuration of a sensor data transmitting apparatus 20 according to an embodiment of the disclosure.

Referring to FIG. 2, a sensor data transmitting apparatus 20 transmitting sensor data with low power is constituted while including a timer module 201, a processor 202, a wireless communicator 203, a storage 204 and a battery (not shown). Sensor data measured by a sensor 10 is transmitted and received by a processor 202. An AP 30 is connected with the wireless communicator 203, and may transmit and receive data and information on a network.

The timer module 201 is located inside the sensor data transmitting apparatus 20, and may include a real time clock, and periodically generates a wake-up signal according to a predetermined time, and transmits the signal to the processor 202. Here, a wake-up signal is a signal ordering the processor 202 to convert/boot the sensor data transmitting apparatus 20 from a sleep mode to a small booting mode. The processor 202 that received a wake-up signal executes a small booting code.

The processor 202 controls the overall operations of the sensor data transmitting apparatus 20. The processor 202 may convert/boot the sensor data transmitting apparatus 20 from a sleep mode to a small booting mode or convert/reboot the sensor data transmitting apparatus 20 from a small booting mode to a full booting mode. Also, the processor 202 reads sensor data from the sensor 10 and stores the sensor data in the volatile memory in the storage 204, and transmits the sensor data to the AP 30 through the wireless communicator 203.

A sleep mode means a mode that power is blocked for all components excluding the timer module 201 including a real time clock in the sensor data transmitting apparatus 20. Meanwhile, a small booting mode and a full booting mode will be described in detail in the description related to FIG. 3.

The wireless communicator 203 is a component that enables the sensor data transmitting apparatus 20 to access a network through the AP 30. The wireless communicator 203 receives a beacon signal from the AP 30 through wireless communication. The wireless communicator 203 may add a user datagram protocol (UDP) header to sensor data that the processor 202 transmits to the AP 30 and transmit the sensor data in the form of a UDP packet, and receive a hardware acknowledgement (ACK), a unicast frame or a deauthentication frame (deauth frame) from the AP 30.

A beacon signal means a signal according to a network standard set between the wireless communicator 203 and the AP 30. That is, a beacon signal is a signal that the AP 30 transmits to inform of the existence of a wireless network, and enables the sensor data transmitting apparatus 20 to participate in the wireless network. The wireless communicator 203 that received a beacon signal may transmit a response thereto to the AP 30, and may access a wireless communication network via the AP 30.

A unicast frame is a frame for transmitting data only to a specific receiver, and a deauthentication frame is a frame that makes connection of a client to a network released, and reconnection of such a client may be attempted later while including reconnection. Here, a unicast frame is a packet for the AP 30 to transmit data only to the side of the wireless communicator 203, and a deauthentication frame is a packet for the AP 30 to release wireless network connection with the wireless communicator 203.

The storage 204 includes a volatile memory and a non-volatile memory. While sensor data received from the sensor 10 is stored in the volatile memory and is accumulated, on the other hand, a small booting code and a full booting code of the sensor data transmitting apparatus 20 are stored in the non-volatile memory. The volatile memory in the storage 204 may store sensor data read by the processor 202 in the form of a queue. The stored sensor data is not erased in a sleep mode of the sensor data transmitting apparatus 20, according to an embodiment of the disclosure illustrated in FIG. 4.

A battery stores electronic energy, and provides power necessary for the sensor data transmitting apparatus 20. A charge amount of the battery may be measured by the processor 202. Meanwhile, the charge amount of the battery may include the size of the voltage.

With respect to the battery, the processor 202 measures the charge amount of the battery before transmitting sensor data to the AP 30 through the wireless communicator 203 during a small booting mode of the sensor data transmitting apparatus 20.

In case the charge amount of the battery is smaller than a predetermined charge amount, the processor 202 lowers transmission power for sensor data transmitted to the AP 30. Also, the processor 202 checks the charge amount of the battery before the wireless communicator 203 receives a unicast frame or a deauthentication frame from the AP 30, and the sensor data transmitting apparatus 20 is converted/rebooted in a full booting mode. In case the charge amount of the battery is smaller than a predetermined charge amount, the processor 202 does not convert/reboot the sensor data transmitting apparatus 20 in a full booting mode. This is for preventing stopping of the sensor data transmitting apparatus 20 due to discharge of the battery.

The access point (AP) 30 is a device that enables the sensor data transmitting apparatus 20 to communicate with Wi-Fi which is a wireless network, etc. The AP 30 periodically transmits a beacon signal for connection with the wireless communicator 203. Also, the processor 202 may transmit sensor data to an entity on a network through the AP 30. In addition, the AP 30 may request a specific command to the sensor data transmitting apparatus 20, or transmit a unicast frame or a deauthentication frame to the wireless communicator 203 when reconnection with the wireless communicator is wanted after connection to the network is released, depending on needs.

Hereinafter, a method for transmitting sensor data according to an embodiment of the disclosure will be described in detail.

The processor 202 transmits sensor data to the AP 30 through the wireless communicator 203. Here, the wireless communicator 203 transmits sensor data in the form of a user datagram protocol (UDP) packet for enhancing the transmission speed of sensor data.

A UDP means a communication protocol in a type of transmitting information unilaterally from one side, but not a type of transmitting and receiving information on the Internet. As a UDP does not use an ACK checking transmission and receipt of information, it has a characteristic that transmission speed is fast. Meanwhile, as a UDP does not go through a process of checking transmission and receipt of data, even if data loss occurs, there is no way to check the loss.

In an embodiment of the disclosure, transmitting sensor data in the form of a UDP packet means that the wireless communicator 203 checks only a hardware ACK from the AP 30, and does not check a server ACK. A hardware ACK is a response by the AP 30 for transmission of a UDP packet, and an ACK confirming whether the AP received a UDP packet to the wireless communicator 203. In contrast, a server ACK means an ACK that checks whether a server connected to the AP 30 received data.

Also, in an embodiment of the disclosure, for minimizing data loss according to transmitting sensor data in the form of a UDP packet, in case the wireless communicator 203 does not receive a hardware ACK from the AP 30, the processor 202 may transmit the sensor data to the AP 30 again. Meanwhile, if the number of times of transmitting sensor data exceeds a predetermined number of times, transmission of sensor data is stopped, and the sensor data transmitting apparatus 20 is converted to a sleep mode.

In addition, in an embodiment of the disclosure, for minimizing data loss according to transmitting sensor data in the form of a UDP packet, sensor data measured in a cycle may be transmitted together with sensor data previously measured.

Figure 4:
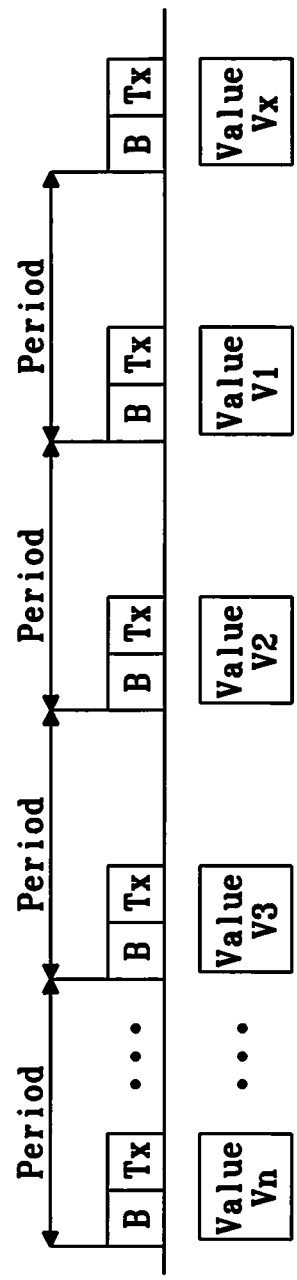
FIG. 4 is a diagram for illustrating an example wherein a wireless communicator according to an embodiment of the disclosure transmits both sensor data measured in one booting cycle and n sensor data measured previously.

Referring to FIG. 4, processes of booting (B) and transmitting sensor data (Tx) for each cycle are illustrated schematically, and a random $n^{th}$ sensor data (Value Vn) is illustrated. In the case of transmitting sensor data in an $x^{th}$ cycle, sensor data measured in the $x^{th}$ cycle may be transmitted to the AP 30 together with sensor data measured from the $x^{th}$ cycle until the previous $n^{th}$ cycle. The processor 202 includes both sensor data collected in the current cycle and sensor data collected in one or more previous cycles in a UDP format and transmits the sensor data to the AP 30.

That is, sensor data measured in a cycle is transmitted together with sensor data from the cycle until the previous $n^{th}$ cycle. Here, n is a natural number that may randomly set. For example, when transmitting sensor data in a 10th cycle, if n is 3, 7th, 8th, and 9th sensor data is transmitted together in addition to the 10th sensor data. For this, the storage 204 stores sensor data in the form of a queue.

Figure 3:
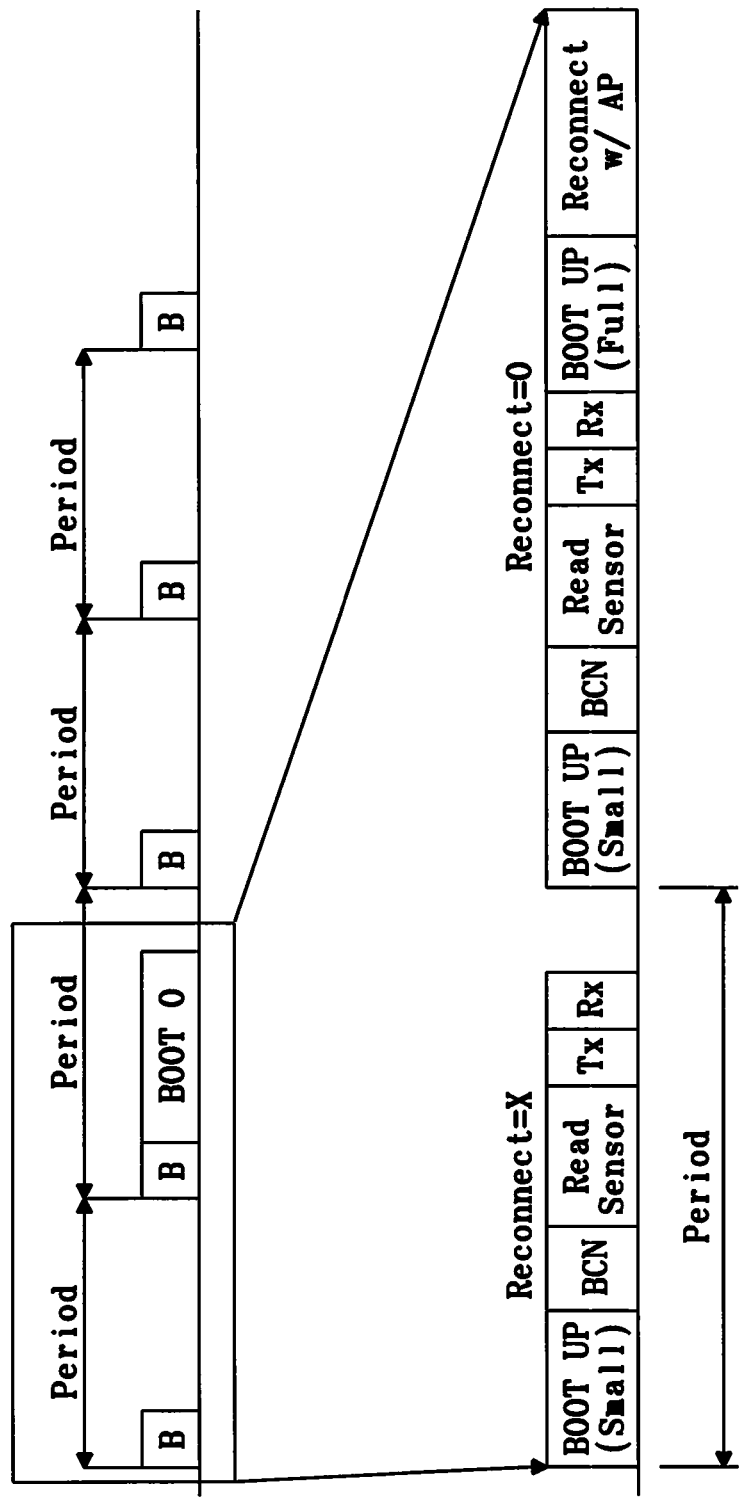
FIG. 3 is a diagram for illustrating a small booting mode and a full booting mode of a sensor data transmitting apparatus according to an embodiment of the disclosure.

FIG. 3 is a diagram for illustrating a small booting mode and a full booting mode of a sensor data transmitting apparatus 20 according to an embodiment of the disclosure.

First, referring to a small booting mode and a full booting mode in detail, a small booting mode is a booting mode operating only minimum components necessary for measuring and transmitting sensor data. In a small booting mode, sensor data is measured and only a code necessary for transmitting the sensor data to the AP 30 is executed, without having to operate a code initializing other components in a chip, other than an essential operation code for measuring sensor data. As power consumption by the sensor data transmitting apparatus 20 is mostly in proportion to the size of a code executed and the length of an execution cycle, a cycle of code execution of the sensor data transmitting apparatus 20 is shorter in a small booting mode of which code is simpler than that of a full booting mode, and thus power consumption can be reduced.

In contrast, a full booting mode is a mode that sensor data is measured and transmitted after all components in the sensor data transmitting apparatus 20 go through initialization processes such that the entire system of the sensor data transmitting apparatus 20 operates. In the initialization processes, power for components that are operating in a small booting mode is blocked, and then all components in the sensor data transmitting apparatus 20 are booted as they are provided with power. A full booting mode is executed when the wireless communicator 203 receives any one of a unicast frame or a deauthentication frame from the AP 30. Also, a full booting mode is executed by a request by the AP 30, and after going through initialization processes, the wireless communicator 203 attempts network connection with the AP 30 again. In the network connection, the wireless communicator 203 receives a beacon signal from the AP 30, and exchanges a key value by encryption between the wireless communicator 203 and the AP 30.

Referring to FIG. 3, the sensor data transmitting apparatus 20 is periodically booted, and transmits sensor data to the AP 30 through the wireless communicator 203.

In an embodiment of the disclosure, when the processor 202 receives a wake-up signal from the timer module 201, the processor 202 executes a small booting code, and makes the sensor data transmitting apparatus 20 booted in a small booting mode. When the sensor data transmitting apparatus 20 is booted in a small booting mode, the wireless communicator 203 receives a beacon signal from the AP 30, and checks the connection state with the AP 30. Then, the processor 202 measures sensor data from the sensor 10 and stores the sensor data in the volatile memory, and transmits (Tx) the sensor data to the AP 30 through the wireless communicator 203. Afterwards, if the wireless communicator 203 does not receive (Rx) a unicast frame or a deauthentication frame from the AP 30 for a specific period of time, the sensor data transmitting apparatus 20 is converted to a sleep mode. Also, the processor 202 sets time when a wake-up signal of the timer module 201 is generated before the sensor data transmitting apparatus 20 is converted to a sleep mode. After a predetermined time passes, the timer module 201 generates a wake-up signal and transmits the signal to the processor 202, and the processor 202 executes a small booting code and makes the sensor data transmitting apparatus 20 booted in a small booting mode.

In contrast, after transmission (Tx) of the sensor data, if the wireless communicator 203 receives (Rx) a unicast frame or a deauthentication frame after receiving a hardware ACK from the AP 30, the processor 202 executes a full booting code, and the sensor data transmitting apparatus 20 is converted to a full booting mode. That is, the sensor data transmitting apparatus 20 is converted to/rebooted in a full booting mode when it responds to a request by the AP 30 or network connection with the AP is released. Here, the sensor data transmitting apparatus 20 goes through initialization processes wherein power for components that are operating in a small booting mode is blocked, and then all components in the sensor data transmitting apparatus 20 are provided with power and are booted. Then, the wireless communicator 203 exchanges a key value with the AP 30 to perform network connection with the AP 30 again. A key value is a value that is used for encryption for authentication with respect to a network, as well as for preventing data leakage in a process of wireless communication. When a key value is exchanged and the wireless communicator 203 and the AP 30 are connected again, the processor 202 sets the time when a wake-up signal of the timer module 201 is generated, and the sensor data transmitting apparatus 20 is converted to a sleep mode.

FIG. 4 is a diagram for illustrating an example wherein a processor 202 according to an embodiment of the disclosure transmits both sensor data measured in one booting cycle and n sensor data measured previously. Description in this regard will be omitted, as the description was already made with respect to FIG. 2.

Figure 5:
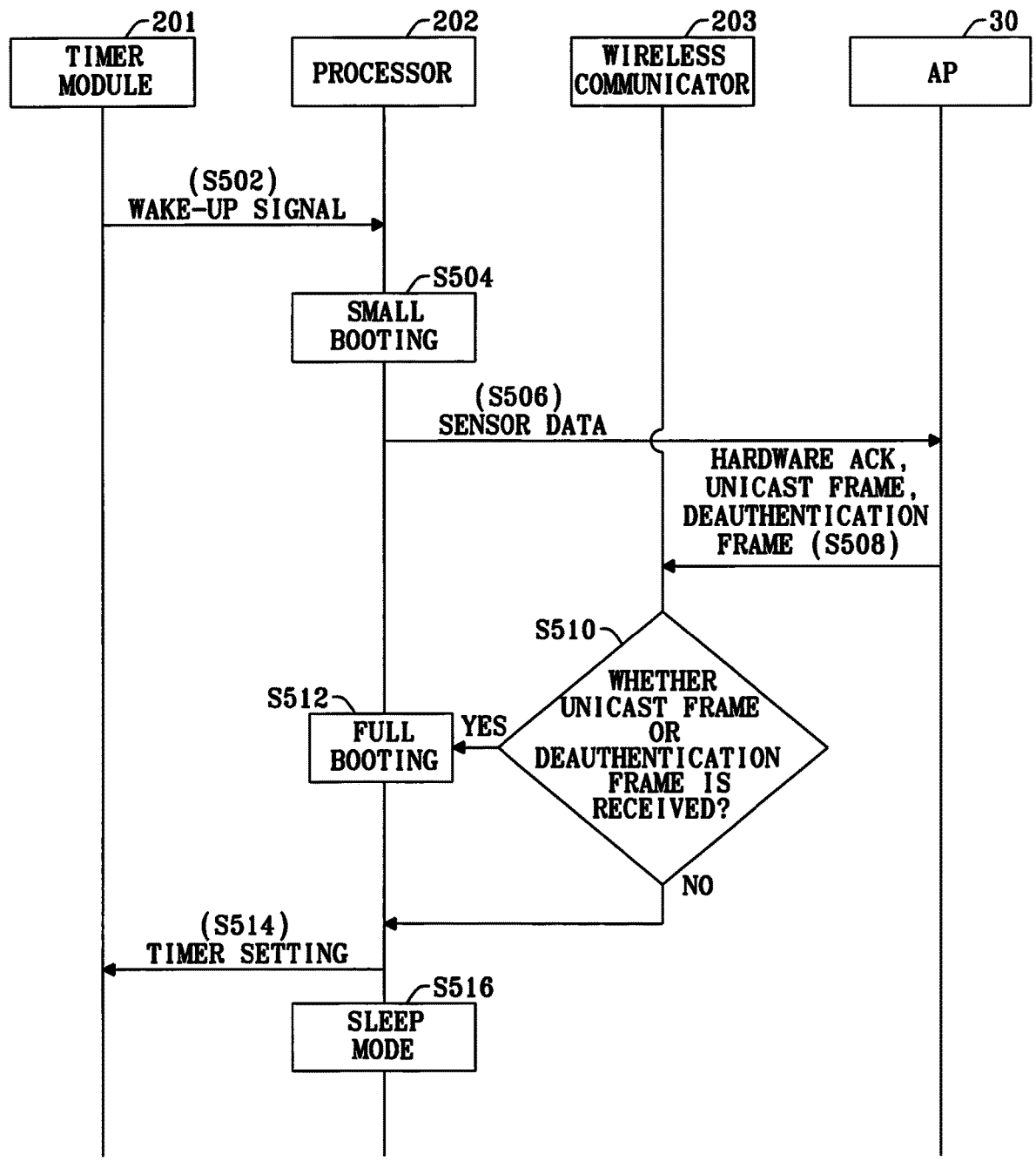
FIG. 5 is a diagram illustrating a process wherein a sensor data transmitting apparatus according to an embodiment of the disclosure is booted, and transmits sensor data.

FIG. 5 is a diagram illustrating a process wherein a sensor data transmitting apparatus 20 according to an embodiment of the disclosure is booted, and transmits sensor data.

First, the timer module 201 transmits a wake-up signal to the processor 202 according to a predetermined time (S502). The processor 202 that received the wake-up signal converts/boots the sensor data transmitting apparatus 20 in a small booting mode (S504).

The processor 202 reads sensor data from the sensor 10 of the sensor data transmitting apparatus 20, and transmits the sensor data to the AP 30 through the wireless communicator 203 (S506). Here, the processor 202 transmits the sensor data in the form of a UDP packet. For reducing loss in data transmission by a UDP method, the processor 202 transmits sensor data measured in a cycle together with some of sensor data measured previously.

The wireless communicator 203 checks a hardware ACK from the AP 30 that received the sensor data, and may also receive a unicast frame or a deauthentication frame depending on the needs of the AP 30 (S508). Here, if the wireless communicator 203 does not receive a hardware ACK from the AP 30, the processor 202 retransmits sensor data during a predetermined number of times.

The wireless communicator 203 determines whether a unicast frame or a deauthentication frame was received from the AP 30 (S510).

If the wireless communicator 203 receives a unicast frame or a deauthentication frame from the AP 30, the processor 202 converts/reboots the sensor data transmitting apparatus 20 in a full booting mode (S512). Here, the sensor data transmitting apparatus 20 goes through initialization processes wherein power for components that are operating in a small booting mode is blocked, and then all components in the sensor data transmitting apparatus 20 are provided with power and are booted. Then, the wireless communicator 203 exchanges a key value with the AP 30 to perform network connection with the AP 30 again.

If the wireless communicator 203 does not receive a unicast frame or a deauthentication frame from the AP 30, or the sensor data transmitting apparatus 20 is converted to a full booting mode, the processor 202 sets the time when a wake-up signal of the timer module 201 is generated (S514), and converts the sensor data transmitting apparatus 20 to a sleep mode (S516).

Figure 6A:
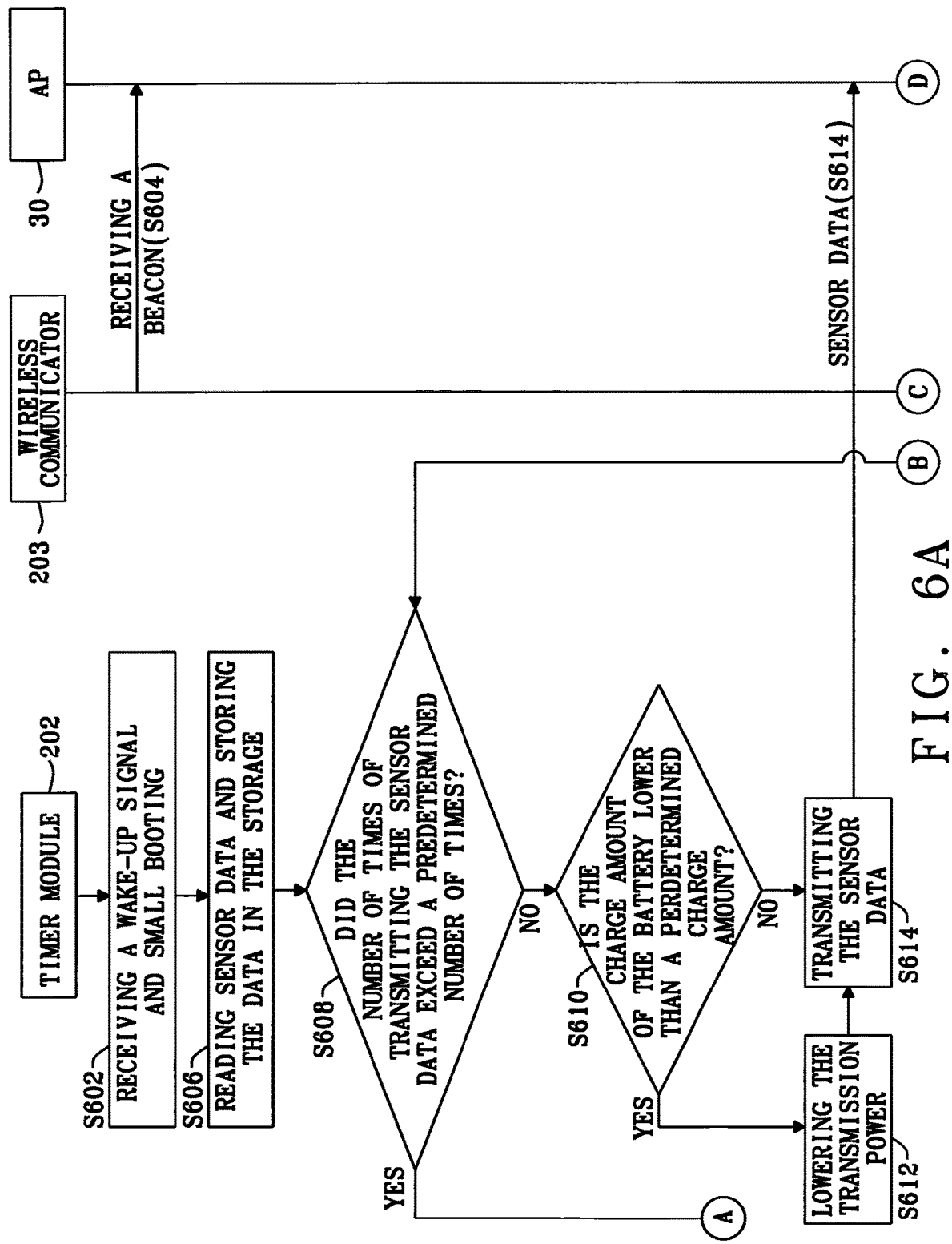
FIGS. 6A and 6B are diagrams illustrating in detail a method for a sensor data transmitting apparatus according to an embodiment of the disclosure to be booted according to each condition, and transmit sensor data.
Figure 6B:
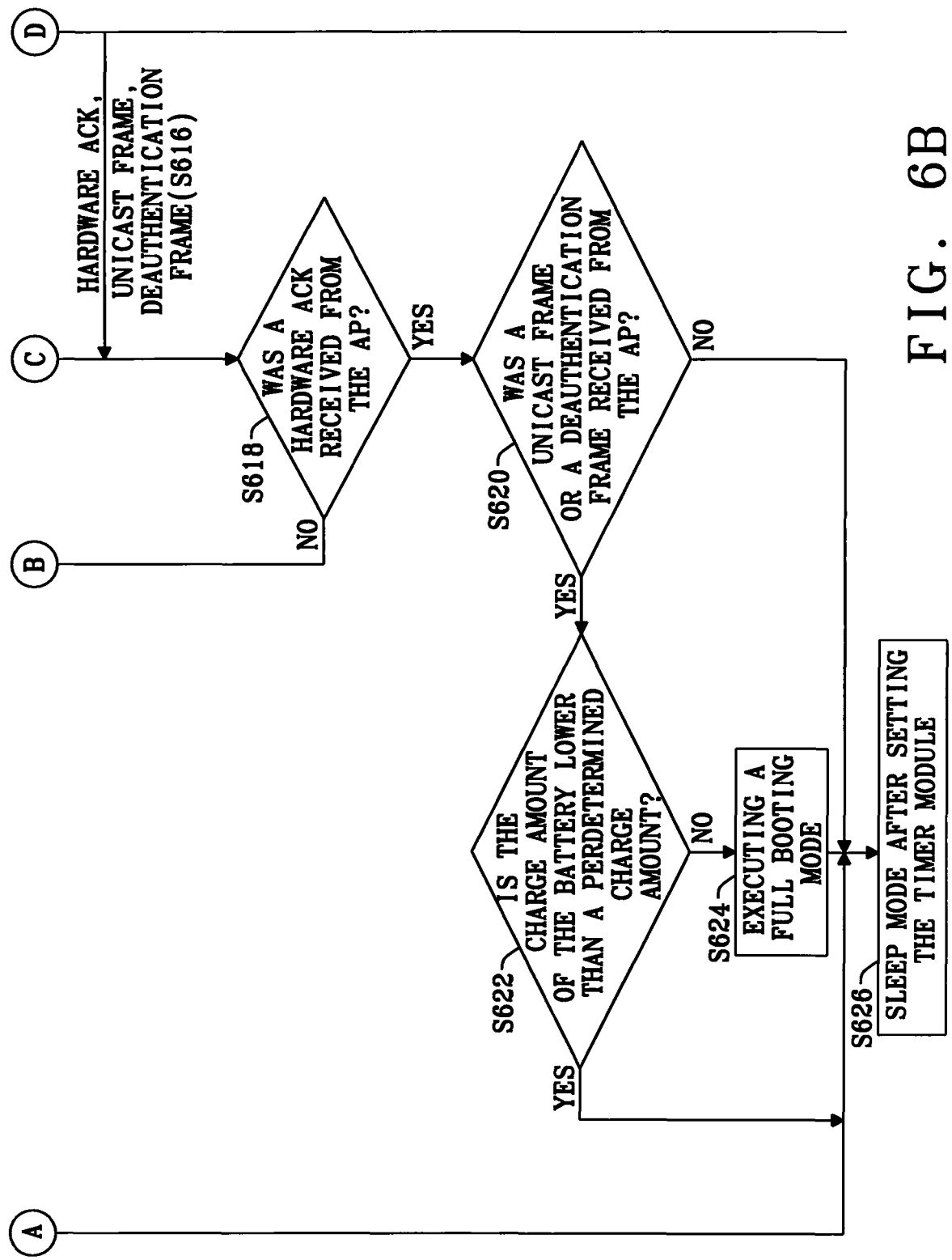

FIGS. 6A and 6B are diagrams illustrating in detail a method for a sensor data transmitting apparatus 20 according to an embodiment of the disclosure to be booted according to each condition, and transmit sensor data.

During the sleep mode of the sensor data transmitting apparatus 20, the processor 202 receives a wake-up signal from the timer module 201 (S602). The wake-up signal orders the processor 202 to execute a small booting code and convert/boot the sensor data transmitting apparatus 20 from a sleep mode to a small booting mode.

After the small booting of the sensor data transmitting apparatus 20, the wireless communicator 203 receives a beacon signal from the AP 30, and connects a wireless network (S604).

When the sensor data transmitting apparatus 20 is booted in a small booting mode, it reads sensor data from the sensor 10, and stores the sensor data in the volatile memory (S606). Here, the volatile memory 204 stores the sensor data in the form of a queue, and the stored sensor data is not erased during a sleep mode of the sensor data transmitting apparatus 20.

The processor 202 determines whether a number of times of transmitting sensor data exceeded a predetermined number of times (S608).

If the number of times of transmission did not exceed a predetermined number of times, the processor 202 determines whether a charge amount of a battery is lower than a predetermined charge amount (S610).

If the charge amount of the battery is lower than a predetermined charge amount, the processor 202 lowers the transmission power for the sensor data transmitted to the AP 30, and thereby promotes stability of the power of the battery (S612).

If the charge amount of the battery is not lower than a predetermined charge amount, the processor 202 transmits the sensor data together with the sensor data measured previously (S614).

When the AP 30 receives the sensor data, it transmits a hardware ACK to the wireless communicator 203, and transmits a unicast frame or a deauthentication frame depending on needs (S616).

The wireless communicator 203 determines whether a hardware ACK was received from the AP 30 (S618). In case the wireless communicator 203 did not receive a hardware ACK, the processor 202 determines again whether the number of times of transmitting the sensor data exceeded a predetermined number of times.

In case the wireless communicator 203 received a hardware ACK from the AP 30, the wireless communicator 203 determines whether a unicast frame or a deauthentication frame was received from the AP 30 (S620).

If the wireless communicator 203 received a unicast frame or a deauthentication frame, the processor 202 determines whether the charge amount of the battery is lower than a predetermined charge amount (S622).

If the charge amount of the battery is not lower than a predetermined charge amount, the processor 202 converts the sensor data transmitting apparatus 20 to a full booting mode (S624). When the sensor data transmitting apparatus 20 is converted to a full booting mode, all components in the sensor data transmitting apparatus 20 are initialized, and power is applied to all components necessary for operating the sensor data transmitting apparatus 20. When the sensor data transmitting apparatus 20 is converted to a full booting mode, the wireless communicator 203 exchanges a key value with the AP 30 to perform network connection with the AP 30 again.

In case the number of times of transmitting the sensor data by the sensor data transmitting apparatus 20 exceeded a predetermined number of times, or the wireless communicator 203 did not receive a unicast frame or a deauthentication frame, or the charge amount of the battery is lower than a predetermined charge amount, or the sensor data transmitting apparatus 20 was booted in a full booting mode, the processor 202 sets the time when a wake-up signal of the timer module 201 is generated, and converts the sensor data transmitting apparatus 20 to a sleep mode (S626).

Although the steps in the respective flowcharts are described to be sequentially performed, they merely instantiate the technical idea of some embodiments of the present disclosure. Therefore, a person having ordinary skill in the pertinent art could perform the steps by changing the sequences described in the respective drawings or by performing two or more of the steps in parallel, and hence the steps in the respective flowcharts are not limited to the illustrated chronological sequences.

Figure 7:
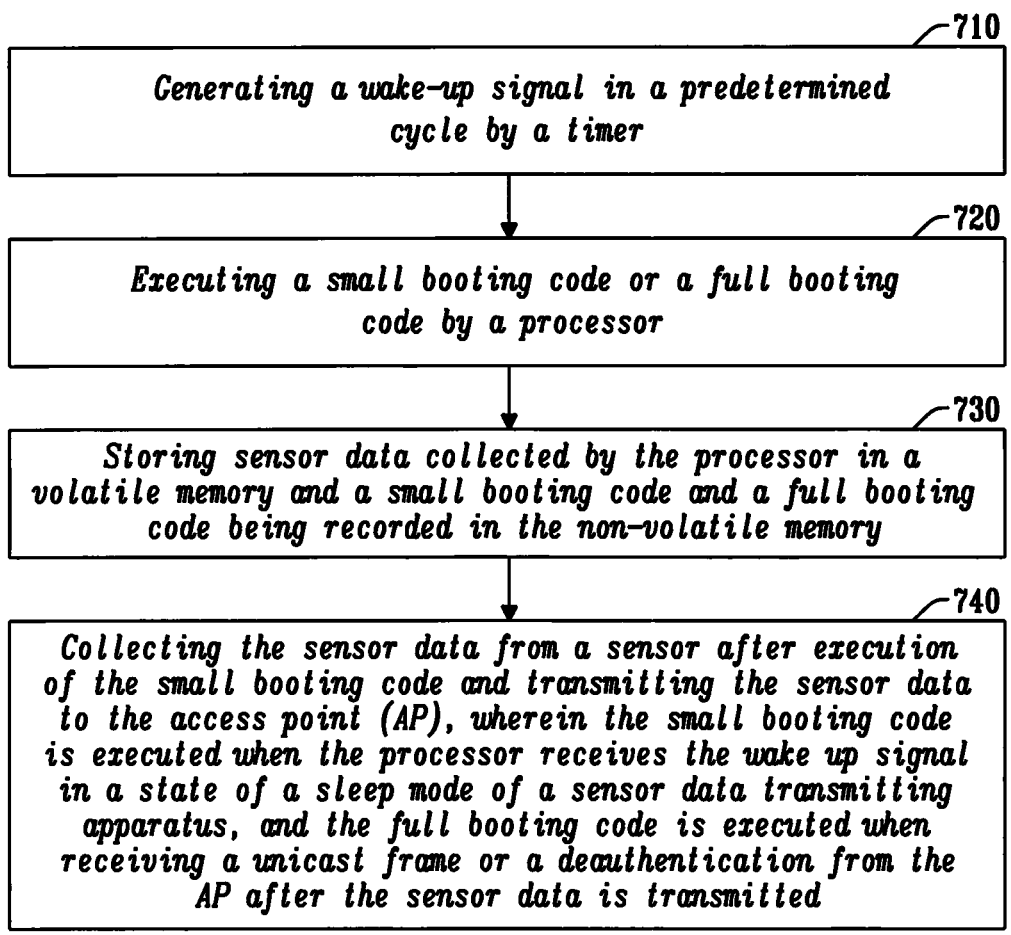
FIG. 7 is a diagram illustrating a method for booting a sensor data transmitting apparatus and transmitting sensor data.

FIG. 7 is a diagram illustrating a method for booting a sensor data transmitting apparatus and transmitting sensor data. The steps include 710, generating a wake-up signal in a predetermined cycle by a timer. The steps also include 720, executing a small booting code or a full booting code by a processor. The steps include 730, storing sensor data collected by the processor in a volatile memory, and a small booting code and a full booting code being recorded in the non-volatile memory. The steps also include 740, collecting the sensor data from a sensor after execution of the small booting code and transmitting the sensor data to the access point, where the small booting code is executed when the processor receives the wake-up signal in a state of a sleep mode of the sensor data transmitting apparatus, and the full booting code is executed when receiving a unicast frame or a deauthentication frame from the AP after the sensor data is transmitted.

Various implementations of the systems and methods described herein may be realized through digital electronic circuitry, integrated circuits, field-programmable gate arrays (FPGAs), application-specific integrated circuits (ASICs), computer hardware, firmware, software, and/or their combination. These various implementations can include those realized in one or more computer programs executable on a programmable system. The programmable system includes at least one programmable processor coupled to receive and transmit data and instructions to and from a storage system, at least one input device, and at least one output device, wherein the programmable processor may be a special-purpose processor or a general-purpose processor. Computer programs (which are also known as programs, software, software applications or code) contain instructions for a programmable processor and are stored in a "computer-readable recording medium."

The computer-readable recording medium refers to any computer program product, apparatus, and/or device (e.g., non-volatile or non-transitory recording medium such as CD-ROM, ROM, memory card, hard disk, an optical/magnetic disk, storage devices, and the like) used to provide instructions and/or data to a programmable processor.

Various implementations of the systems and techniques described herein can be realized by a programmable computer. Here, the computer includes a programmable processor, a data storage system (including volatile memory, nonvolatile memory, or any other type of storage system or a combination thereof) and at least one communication interface. For example, the programmable computer may be one of a server, a network device, a set-top box, an embedded device, a computer expansion module, a personal computer, a laptop, a personal data assistant (PDA), a cloud computing system, or a mobile device.

Although exemplary embodiments of the present disclosure have been described for illustrative purposes, those skilled in the art will appreciate that various modifications, additions, and substitutions are possible, without departing from the various characteristics of the disclosure. Therefore, exemplary embodiments of the present disclosure have been described for the sake of brevity and clarity. Accordingly, one of ordinary skill would understand the scope of the disclosure is not limited by the above explicitly described embodiments but by the claims and equivalents thereof.

What is claimed is:

1. A sensor data transmitting apparatus periodically transmitting sensor data, comprising:
a wireless communicator configured to access a network through an access point (AP);
a timer module configured to generate a wake-up signal in a predetermined cycle;
a storage configured to include a non-volatile memory and a volatile memory, a small booting code and a full booting code being recorded in the non-volatile memory and the volatile memory being capable of recording the sensor data; and
a processor configured to execute the small booting code or the full booting code, collect the sensor data from a sensor and transmit the sensor data to the AP after execution of the small booting code;
wherein the small booting code is executed when the processor receives the wake-up signal in a state of a sleep mode of the sensor data transmitting apparatus, and the full booting code is executed when the wireless communicator receives a unicast frame or a deauthentication frame from the AP after the sensor data is transmitted.

2. The sensor data transmitting apparatus of claim 1, wherein the processor transmits the sensor data to the AP through the wireless communicator in a form of a user datagram protocol (UDP) packet.

3. The sensor data transmitting apparatus of claim 2, wherein the processor retransmits the UDP packet to the AP by a predetermined number of times when the wireless communicator does not receive a hardware acknowledgement (ACK) which is a response for transmission of the UDP packet from the AP.

4. The sensor data transmitting apparatus of claim 2, wherein the processor stores the sensor data collected by the predetermined cycle in the volatile memory and transmits the UDP packet which includes both the sensor data collected in the current cycle and the sensor data collected in one or more previous cycles to the AP.

5. The sensor data transmitting apparatus of claim 1, wherein the wireless communicator replaces a key value with a key value received from the AP when the sensor data transmitting apparatus is rebooted in a full booting mode, and performs wireless communication with the AP again.

6. A method for booting a sensor data transmitting apparatus and periodically transmitting sensor data, comprising:
generating a wake-up signal in a predetermined cycle by a timer;
executing a small booting code or a full booting code by a processor;
storing sensor data collected by the processor in a volatile memory, a small booting code and a full booting code being recorded in the non-volatile memory and the volatile memory being capable of recording the sensor data; and
collecting the sensor data from a sensor and transmitting the sensor data to the AP after execution of the small booting code,
wherein the small booting code is executed when the processor receives the wake-up signal in a state of a sleep mode of the sensor data transmitting apparatus, and the full booting code is executed when receiving a unicast frame or a deauthentication frame from the AP after the sensor data is transmitted.

7. The method of claim 6, wherein in the transmitting, the processor transmits the sensor data to the AP in the form of a user datagram protocol (UDP) packet.

8. The method of claim 7, further comprising:
retransmitting the UDP packet to the AP by a predetermined number of times when not receiving a hardware acknowledgement (ACK) which is a response for transmission of the UDP packet from the AP.

9. The method of claim 7, wherein in the transmitting, the processor stores the sensor data collected by the predetermined cycle in the volatile memory and transmits the UDP packet which includes both the sensor data collected in a current cycle and the sensor data collected in one or more previous cycles to the AP.

10. The method of claim 6, further comprising:
replacing a key value with a key value received from the AP, and performing wireless communication with the AP again when the sensor data transmitting apparatus is rebooted in a full booting mode.

11. A non-transitory computer-readable medium storing a computer program, including computer-executable instructions for causing, when executed in a processor, the processor to perform the method of claim 6.

* * * * *